United States Patent [19]

Zimmerly

[11] Patent Number: 5,232,023
[45] Date of Patent: Aug. 3, 1993

[54] MANIFOLD VALVE ASSEMBLIES

[75] Inventor: Robert D. Zimmerly, Kenosha, Wis.

[73] Assignee: Tri-Clover, Inc., Kenosha, Wis.

[21] Appl. No.: 995,151

[22] Filed: Dec. 22, 1992

[51] Int. Cl.⁵ ............................................. F16K 11/20
[52] U.S. Cl. .................................. 137/637.2; 137/240; 137/597; 137/883
[58] Field of Search ................. 137/614.21, 637.2, 597, 137/883, 240

[56] References Cited

U.S. PATENT DOCUMENTS

| | | | |
|---|---|---|---|
| 1,508,021 | 9/1924 | Lakso | 137/637.2 |
| 3,970,110 | 7/1976 | Schaedler et al. | 137/637.2 X |
| 4,460,014 | 7/1984 | Mases et al. | 137/614.18 |
| 4,530,377 | 7/1985 | Peters | 137/637.2 |
| 4,715,795 | 12/1987 | Habrich et al. | 137/637.2 X |
| 4,757,834 | 7/1988 | Mieth | 137/15 |
| 5,085,241 | 2/1992 | Mieth | 137/240 X |
| 5,146,950 | 9/1992 | Rodgers et al. | 137/883 X |

FOREIGN PATENT DOCUMENTS

| | | | |
|---|---|---|---|
| 1163622 | 2/1964 | Fed. Rep. of Germany | 137/637.2 |
| 2233388 | 1/1974 | Fed. Rep. of Germany | 137/883 |
| 56-49473 | 5/1981 | Japan | 137/637.2 |

Primary Examiner—Stephen M. Hepperle
Attorney, Agent, or Firm—Ryan, Kees & Hohenfeldt

[57] ABSTRACT

A plurality of manifold valve assemblies each including a generally vertical valve cylinder having an inlet port at its top and at least two outlet ports near its bottom. A single actuator valve is fitted for closing each of the ports, each including a valve actuator, an actuator rod attached to and actuatable by the actuator, one end of the rod projecting outward from the actuator, and at least one valve plug attached to the projecting end of the actuator rod. Two of the three valves have rods that are coaxial with each other, the rods being independently actuatable by their respective actuators, a hollow cylindrical valve stem attached to the projecting end of the hollow actuator rod, having a valve plug for opening and closing an inlet port, the valve plug having a central opening through which the first actuator is fitted, the other two valves having valve plugs for opening and closing outlet ports, and being independently controllable by a valve actuator, one of the outlet ports. The outlet ports are configured so that liquids will drain by gravity from the lower end of the cylinder into either one of the outlet ports when the other of the outlet ports is closed.

17 Claims, 5 Drawing Sheets

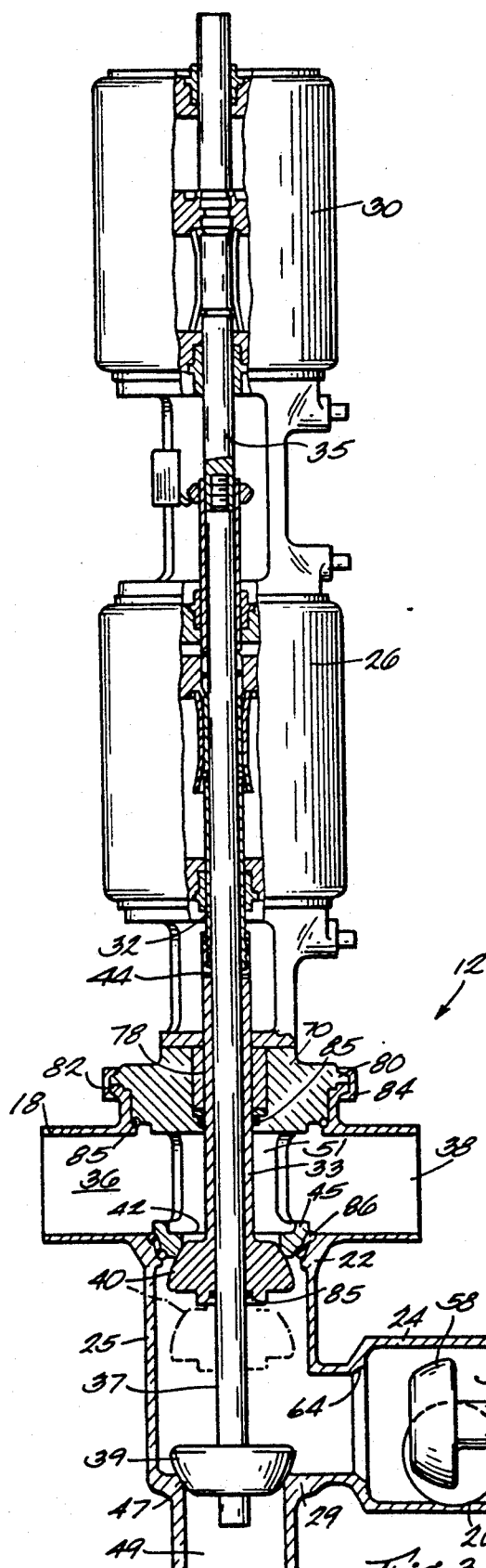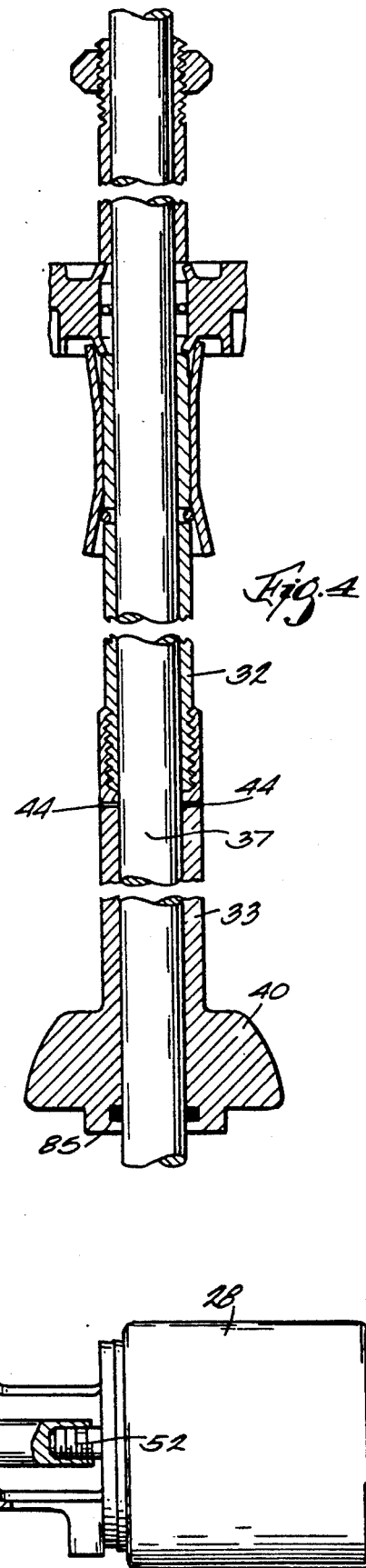
Fig. 3
Fig. 4

MANIFOLD VALVE ASSEMBLIES

BACKGROUND OF THE INVENTION

This invention relates to valves for controlling the flow of fluids, and particularly to block-and-bleed valves assembled together to form manifolds for controlling the flow of fluids, especially liquid foods or beverages, from multiple sources to multiple delivery destinations. The invention represents a further modification of the manifold systems disclosed in my co-pending U.S. patent application Ser. No. 07/918,238 filed Jul. 23, 1992.

It is common in the food packaging industry to have a need to connect a number of sources of a fluid, such as different types of milk or different types of soft drinks, to a number of different filler machines to fill containers, such as gallons, half-gallons, quarts and so on. To date these connections have been accomplished in the form of a manifold, including a number of lines from the source tanks crossing a number of lines leading to the filler machines, with valves being provided to control flow of fluid from any selected one or more of the source tanks to any chosen one or more of the filler machines. This arrangement creates a need for an extremely large number of valves, however. For instance, a single manifold connecting ten source tanks to ten filler machines, would use over a hundred valves to accomplish the control which is necessary and desired.

In the past, it has been conventional to use specially designed valves to control these manifolds, called block-and-bleed valves, sometimes called leak detector valves, with one such valve installed at each manifold intersection. Block-and-bleed valves are particularly applicable to the sanitary industry, because they permit control of flow of different types of fluids through the same valve with double protection against intermixing of those fluids. That is, it may be desirable to have chocolate milk flowing through one part of the valve and white milk through another part, or pasteurized milk through one part and raw milk through another part, or clean-in-place solution through one part and milk or another food fluid through another part. Clearly, it is critical that these fluids not be permitted to mix, and regulations require that even failure of a single seat or valve plug not permit such mixing.

While valves used in the past functioned generally satisfactorily, they were extremely complex and expensive, and included multiple, coaxial, independently operable actuators and valve plugs. Under certain circumstances these valves were subject to substantial leakage and product waste, and when they did fail in this manner, while preventing mix of different fluids, their maintenance was difficult and expensive.

Even the improved systems heretofore devised have suffered from the problem that, once the input and output valves in a particular valve assembly are closed and the drain or "leak detector" port opened, about one quart of the fluid, for example, milk, would be discharged out of the drain and thus wasted. A need has thus continued to exist for improved valve assemblies that are economical, readily controlled and which minimize waste of the fluids being conveyed.

SUMMARY OF THE INVENTION

The present invention provides a manifold valve assembly, that enables the use of three simple valves, individually controllable removable, to control the flow of fluids at each intersection in a manifold and in which each intersection is configured so that substantially all of the fluid can be drained by gravity flow prior to opening of the drain or leak detector port. In accordance with one aspect of the invention, two of valves are combined in a single valve housing and use independently controllable coaxial actuators while a third valve is connected thereto by a short connecting conduit configured so that liquid will drain by gravity from the first two valves through the third to the delivery conduits. The invention also provides for independent control of a drain port that serves as a leak detector. An important aspect of the invention involves the use of concentrically configured or coaxial actuator rods to enable independent control by means of simple actuators that are linearly aligned with each other. Both actuators and valve assemblies are readily removable as a single assembly for repair or replacement.

The invention further contemplates using one such two valve unit with a third inexpensive single-actuator valve all combined together in a single sub-assembly to provide an inexpensive but effective valve assembly. An important advantage of the present invention results from the fact that independent control of the three independently controllable valves enables closing of the inflow valve while the leak detector port remains closed to permit gravity draining of liquids out of the outflow valve, which remains open. After such draining is complete, the outflow valve can be closed and the drain port opened. Thus, no significant loss of fluid occurs when the valves are in motion. The valves of this invention are particularly effective in preventing the inadvertent mixing of different types of fluids, even on failure of one valve seat or valve plug.

An important advantage of the invention relates to the provision of an economical valve assembly that provides a leak detector, or opening to the atmosphere, that complies with applicable regulations governing equipment used in the dairy industry and yet avoids spillage of milk each time the leak detector is opened. Provision is made for controllable separation of food processing circuits from cleaning circuits. In accordance with an important related aspect of the invention, cleaning of the valve assembly is facilitated by the fact that, unlike prior art valve assemblies, each valve in the assembly can be fully and adequately cleaned by virtue of the fact that each valve stem in the system can be fully extended and retracted for purposes of cleaning. This assures adequate cleaning of the valve parts and associated O-rings or similar seals.

Briefly summarized, the invention provides a plurality of manifold valve assemblies each including a generally vertical valve cylinder having an inlet port at its top and at least two outlet ports near its bottom. A single actuator valve is fitted for closing each of the ports, each including a valve actuator, an actuator rod attached to and actuatable by the actuator, one end of the rod projecting outward from the actuator, and at least one valve plug attached to the projecting end of the actuator rod. Two of the three valves have rods that are coaxial with each other, the rods being independently actuatable by their respective actuators, a hollow cylindrical valve stem attached to the projecting end of the hollow actuator rod, having a valve plug for opening and closing an inlet port, the valve plug having a central opening through which the first actuator is fitted, the other two valves having valve plugs for opening and closing outlet ports, and being independently controllable by a valve actuator, one of the outlet ports. The outlet ports are configured so that liquids will drain by gravity from the lower end of the cylinder into either one of the outlet ports when the other of the outlet ports is closed.

Other objects and advantages of the invention will become apparent hereinafter.

DESCRIPTION OF THE DRAWINGS

FIG. 3 is an elevational cross sectional view taken along line 2—2 of FIG. 1 with components shown in different positions than those of FIG. 2.

FIG. 4 is an enlarged fragmentary cross sectional view of the concentric valve stems and one of the valve seats.

FIG. 5 is a fragmentary view with parts is cross section illustrating removal of the coaxial valve subassembly.

DESCRIPTION OF THE PREFERRED EMBODIMENT

Figure 1:
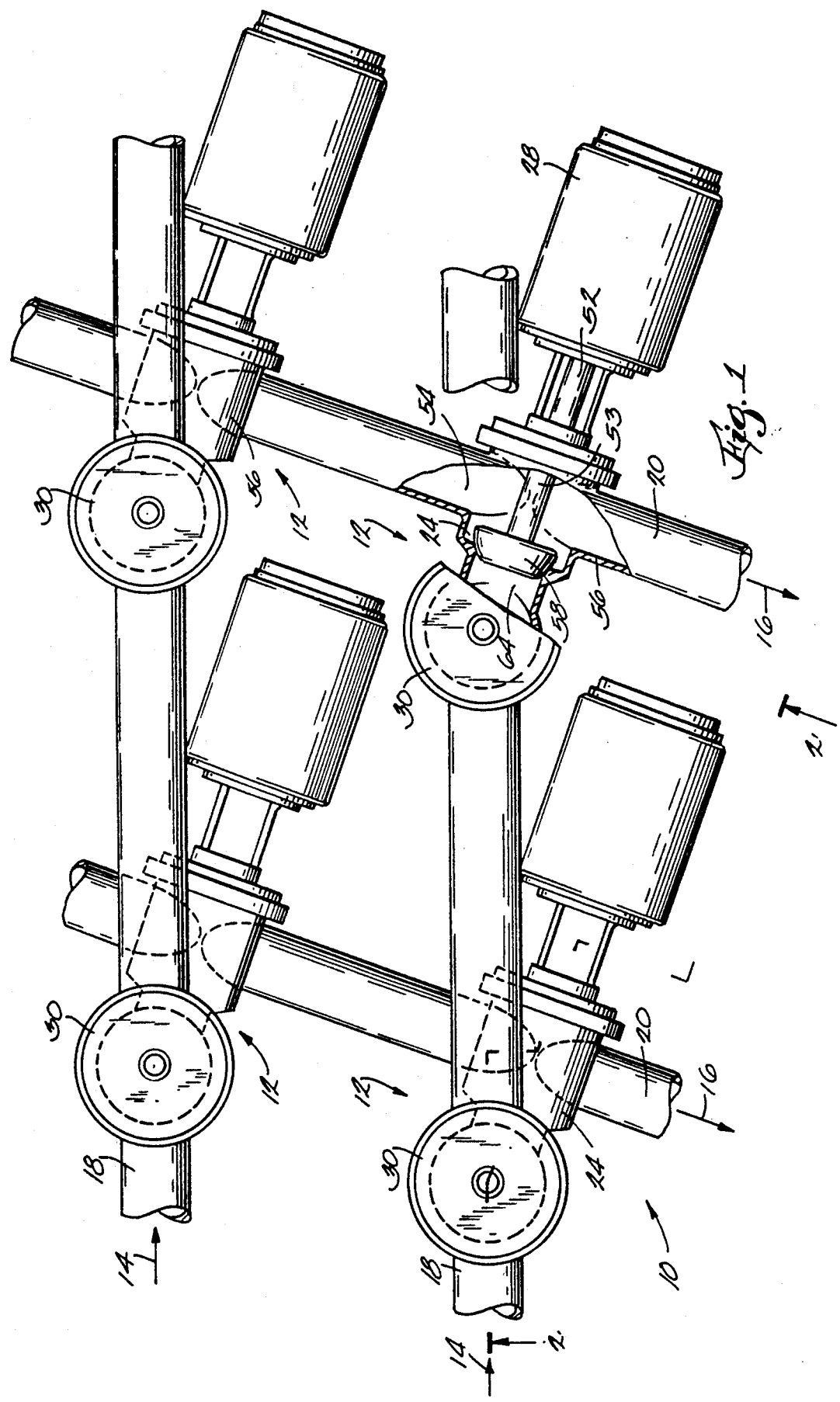
FIG. 1 is a top, partially cut away, view of a manifold valve assembly constructed according to one embodiment of the invention.

Referring now to FIG. 1, there is shown a manifold assembly 10, employing a number of manifold valve assemblies 12 constructed according to one embodiment of the invention. As there shown, the manifold assembly 10 is connected to and receives supply from a number of sources 14, such as tanks of fluid. The manifold assembly 10 is also connected to and supplies the fluid to a number of destinations 16, such as filler machines for filling containers with one or more of the fluids from the fluid supply tanks. The purpose of the manifold assembly 10 is to control and selectively permit the flow of fluid from one or more predetermined sources 14 to a predetermined destination 16. The manifold assembly includes one supply tube 18 for each fluid supply source 14, and one delivery tube 20 for destination 16. While the manifold assembly 10 shown in FIG. 1 is fragmentary, it will be understood that the invention may be applied to any number of fluid supplies and destinations.

As can be seen from FIG. 1, this manifold assembly results in a crossed pattern of supply tubes 18 and delivery tubes 20. The supply tubes 18 and delivery tubes 20 do not actually intersect, but rather are positioned parallel in sets, in parallel planes, with the supply set being in the upper plane and the delivery set being in the lower plane. According to the embodiment of the invention shown in the drawings, the delivery tubes 20 are positioned in a plane beneath the plane of the supply tubes 18 so that fluids will tend to drain toward the delivery tubes by gravity flow. One manifold valve assembly 12 is provided at each crossing point of a supply tube 18 with a delivery tube 20.

Figure 2:
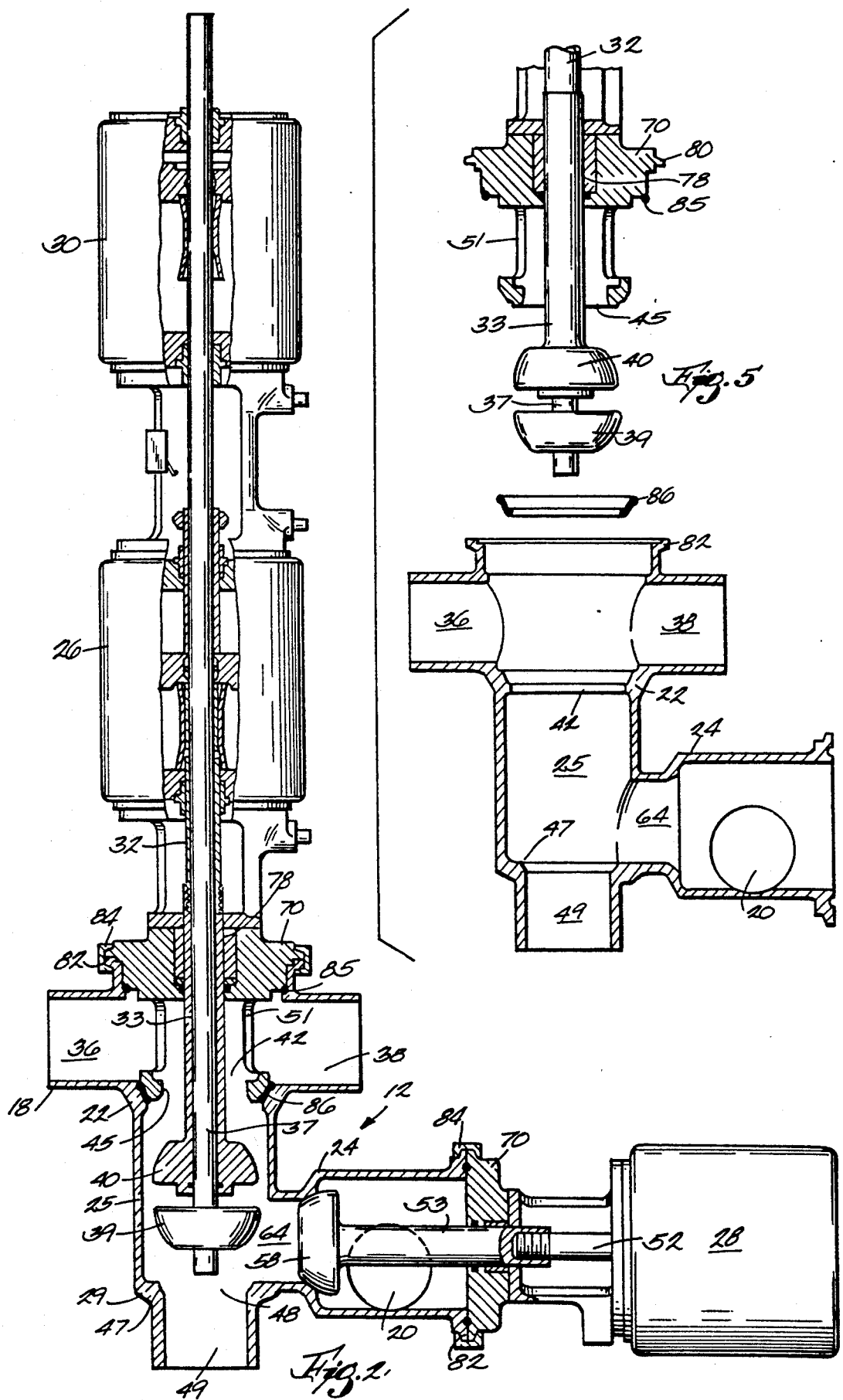
FIG. 2 is an elevational cross sectional view taken along line 2—2 of FIG. 1.

Each manifold valve assembly 12 includes in effect three separate valve bodies, a supply valve body 22 a delivery valve body 24 and a drain port or "leak detector" valve body 29. In the arrangement of FIGS. 1–5 and 7–9 the valve bodies 22 and 24 are formed at opposite ends of a valve cylinder or housing 25. Each of these valve bodies 22, 24 and 29 is supplied with its own actuator assembly 26, 28 and 30, respectively. As shown in FIGS. 2 and 3, valve bodies 22 and 29 are interconnected and linearly aligned with each other. Valve body 29 is connected to the side of valve cylinder 25 at its lower end.

As can best be seen in FIGS. 2 and 3 the delivery tubes 20 are connected to the bottoms of valve bodies 24. Thus liquids will flow by gravity through the valve assemblies toward the delivery tubes 20.

The interior detail of each valve body can be best seen by reference to FIGS. 2 and 3. Supply valve body 22 includes its own actuator 26, having a hollow annular actuator rod 32, actuatable between two positions, as shown. Valve body 22 has, at its top, a pass-through section including an inlet 36 substantially aligned with an outlet 38. Relating FIG. 2 with FIG. 1, the inlet 36 and outlet 38 of the supply valve body 22 connect to and in effect form part of one of the supply tubes 18, permitting flow of fluid from upstream destination valves at all times regardless of whether valve 22 is open or closed.

A valve plug 40 is attached to the end of valve stem 33 which is in turn attached to actuator rod 32. Plug 40 is provided to close a port 42 at the bottom of valve body 25. The perimeter of port 42 is defined by a valve seat 45. The actuator 26 has two positions, one where port 42 is open and the other where port 42 is closed.

As seen in FIGS. 2 and 3, valve 29 is also a simple actuator type valve. Actuator 30 operates in actuator rod 35 which is connected to a valve stem 37. A valve plug 39 is affixed to or integrally formed with valve stem 37. Valve stem 37 is located concentrically within stem 33. Valve plug 39 is adapted to fit into and close a valve seat 47 which defines a port 48 at the bottom of the housing of valve 29 so as to close a drain port 49. Openings 44 in hollow valve stem 32 provide a visual indication in the event of leakage of liquid between the interior of stem 32 and the exterior of stem 37.

Also, delivery valve body 24 has its own actuator 28 connected to an actuator rod 52, actuatable between two positions. Delivery valve body 24 has a pass-through section including an inlet 54 substantially aligned with an outlet 56. Relating FIG. 3 with FIG. 1, the inlet 54 and outlet 56 of the delivery valve body 24 connect to and in effect form part of one of the delivery tubes 20, permitting free flow of fluid to downstream delivery valves at all times regardless of the position of the valve 24.

As with supply valve body 25, actuator rod 52 has affixed thereto a valve stem 53, by any suitable removable means, such as by threading. A valve plug 58 is affixed to or integrally formed with the valve stem 53. Once the valve stem 53 is assembled to the actuator rod, plug 58 is positioned within delivery valve body 24 to close a port 64. As was the case with supply actuator 26, delivery actuator 28 has two positions, one where port 64 is open and the other where port 64 is closed.

Each of the three valves of the assembly can thus be individually controlled. In will be apparent that when supply valve 22 is open, delivery valve body 24 is also open, and valve 29 is closed, that fluid can flow from supply tube 18 into delivery tube 20. Then, to discontinue the flow, valve 22 is closed while valve 29 remains closed for a time sufficient to allow gravity drainage of liquids remaining in the valve bodies through valve 24 into delivery tube 20. Subsequently, valve 24 is closed. Drain port valve 29 is then opened without consequential waste of liquid.

It will also be apparent that, as needed, the supply tubes can be cleaned and drained without affecting the delivery tubes, and vice versa. For example, valves 22 and 29 could be open and valve 24 closed so that the supply side is cleaned without affecting the delivery side, or vice versa.

The invention calls for structure permitting easy removal of the actuator and valve stem from any one of the valves at any time. Using a supply valve body 22 and drain port valve 29 as an example, the valve plugs and upper valve seat 45 are carried by a valve bonnet 70. Valve stems 33 and 37 are inserted through an opening 78 in the bonnet 70. The actuators 26 and 30 together with their associated valve stems, rods and plugs can be installed or removed as a unit that also includes upper valve seat 45. See FIG. 5. The bonnet 70 has a flange 80 which flares outward from the central opening, to fit onto a mating flange surface 82. Upon assembly the two flanges are clamped together by a suitable clamp 84. Sealing means, such as an O-rings 85 and ring gasket 86 can be provided where needed in the assembly to ensure against leakage.

If one of the actuators 26 or 30 requires service, or if one of the valve plugs 40 or 39 needs replacing or other service, the clamp 84 is opened and the actuators and bonnet 70 removed as best seen in FIG. 5. Valve 24 is constructed with a bonnet 70 similar to that described for valve 22 and 29.

It is not unusual for the delivery tubes 16 to be smaller in size than the supply tubes 14, such as 2 inch delivery tubes being used with 3 inch supply tubes. In order to satisfy sanitary requirements, it is necessary that the total drain opening area of the manifold valve assembly 12 is at least as large as the smaller of the supply tubes 14 or the delivery tubes 16.

Valve seat 45 is integral with a cage type structure 51, which is formed with openings so as not to impede the flow of fluid through the passthrough channel, thereby permitting free flow of fluids through tubes 18 The arrangement of FIGS. 1-5 provides the advantage that each of valves closes against the flowing fluid thus avoiding hammering of the valves during closure.

Figure 6:
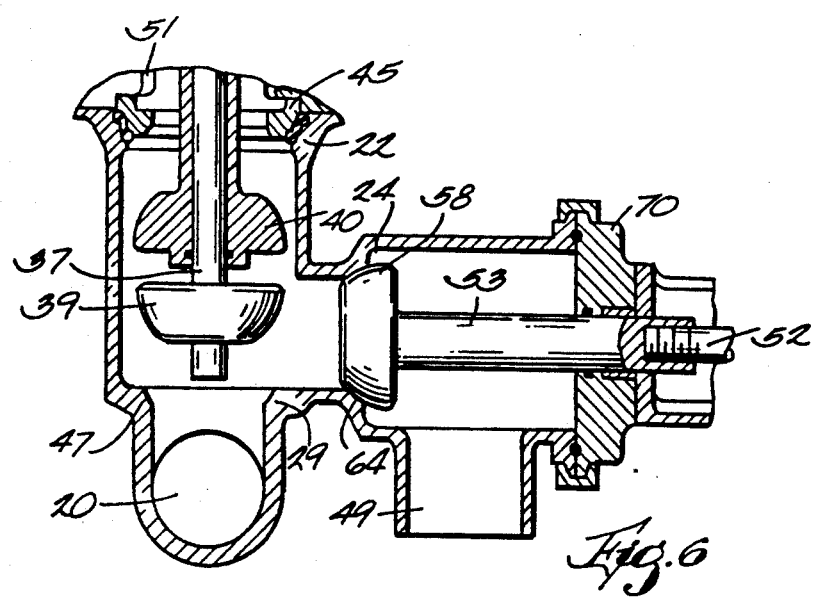
FIG. 6 is a fragmentary vertical cross sectional view illustrating a further embodiment of the invention.

In addition to the specific configurations of valves shown in FIGS. 1-5, other combinations can be used as desired. Specifically, as shown in FIG. 6, drain port 49 can be located so as to be controlled by valve 24 instead of valve 29. In this arrangement the flow to distribution line 20 is located beneath cylinder 25 and is controlled by valve 29.

Figure 7:
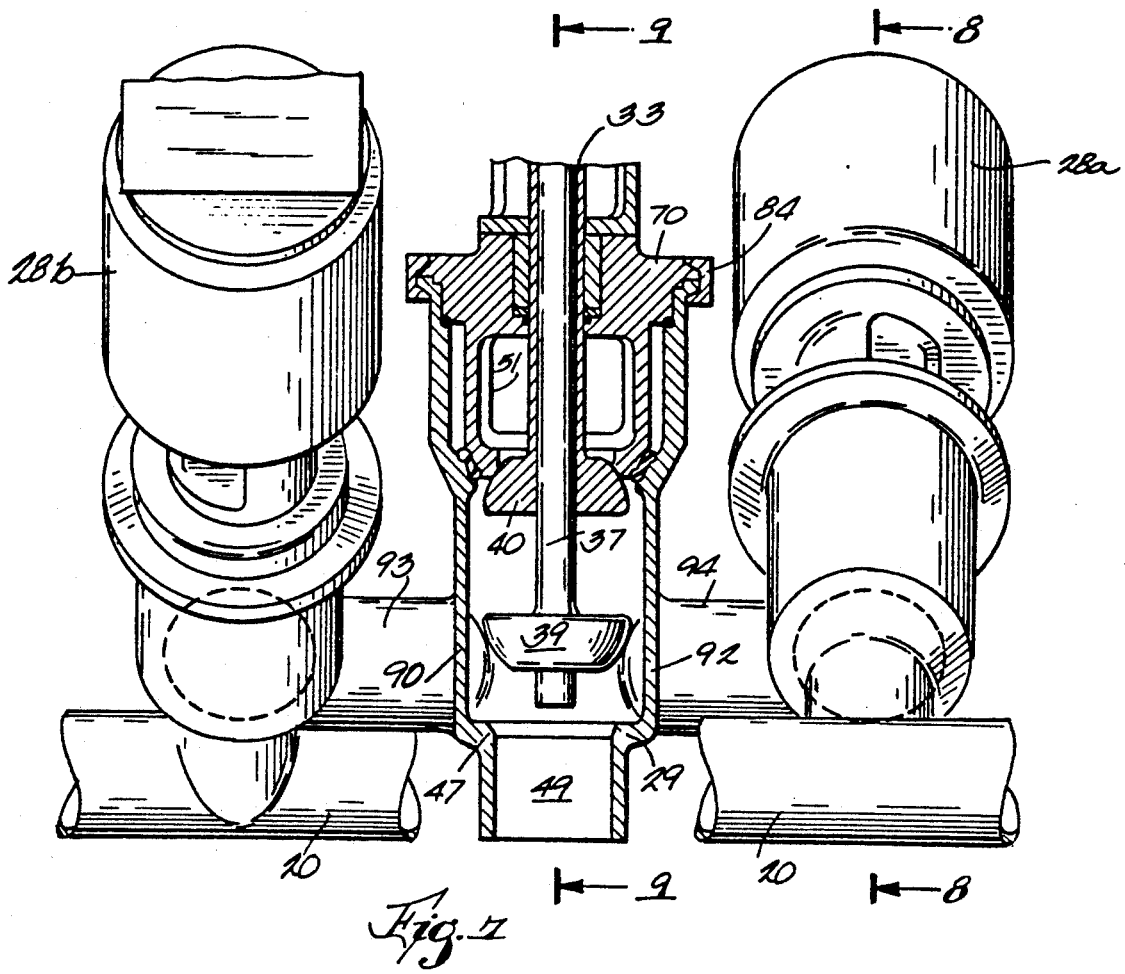
FIG. 7 is an elevational view with parts in cross section showing yet another embodiment of the invention.
Figure 8:
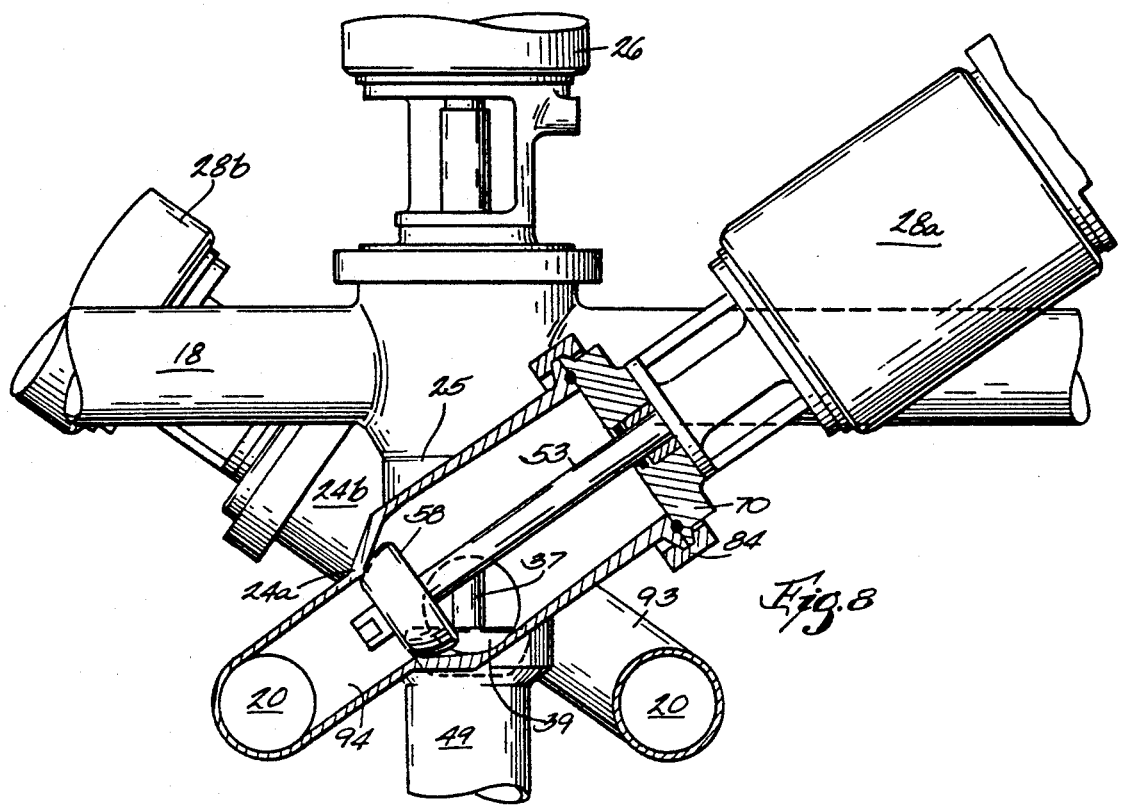
FIG. 8 is a cross sectional view taken along Line 8—8 of FIG. 7.
Figure 9:
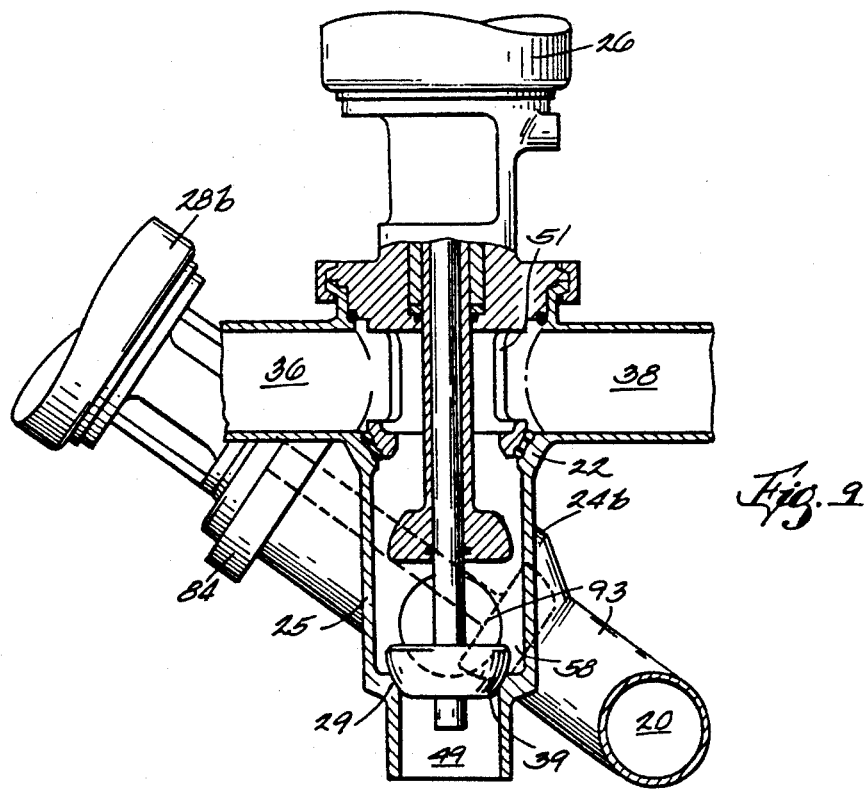
FIG. 9 is a cross sectional view taken along Line 9—9 of FIG. 7.

Referring now to the embodiment of FIGS. 7-9, which show a preferred embodiment of the invention, there is seen a configuration wherein two outlet ports 90 and 92 are provided in the side of cylinder 25. Each of these outlet ports is connected to an elbow conduit 93 and 94, respectively. Valve bodies 24a and 24b are connected to conduits 94 and 93, respectively, and each include valve seats 58 operated by actuators 28a and 28b, respectively. The other valve components are identical to those described above with respect to the embodiment of FIGS. 1-5. It will be noted that each of the conduits 93 and 94 is so located and configured as to allow gravity drainage from cylinder 25 toward distribution conduits 20 when valves 22 and 29 are both closed and valve 24 is open.

The embodiments shown in all of FIGS. 1-9 utilize the same arrangement for attachment of the valve bonnet and other operational details. These are therefore not repeated herein. It will be noted that by use of a single valve housing with each outlet therefrom capable of gravity drainage of liquids therefrom, a great reduction of waste is achieved. Cleaning of either the supply side or distribution side of the assembly while maintaining separation of the opposite side is also facilitated. It will also be noted that both of the valves 22 and 29 can travel a sufficient distance to facilitate cleaning of the valve components.

Note that, in operation, port 49 can be closed by means of valve seat 39 prior to opening of ports 42 and 64. Thus no waste of fluid occurs when the valves are in motion.

A further variation of the present invention involves the addition of a side port for the purpose of installing an air blow check valve. Such valves are known in the art and are used to provide a means for blowing out of the lines and valves by means of air pressure. Such blowing may be desired in order to insure that all liquid is expelled prior to further use of the system. Such port would be provided in addition to the other ports already described herein.

It will be noted that each embodiment of the invention enables use of three simple single actuator valves to perform fluid flow control operations that previously required costly and complex valves. Use of these valves in accordance with the invention still prevents the mixing of different types of fluids running through the same valve assembly, even on failure of one valve seat or valve plug.

While the apparatus hereinbefore described is effectively adapted to fulfill the aforesaid objects, it is to be understood that the invention is not intended to be limited to the specific preferred embodiment of manifold valve assembly set forth above. Rather, it is to be taken as including all reasonable equivalents within the scope of the following claims.

I claim:

1. A manifold valve assembly, comprising: a first valve body formed of a valve cylinder having an upper end and a lower end, an inlet port at the upper end thereof, an outlet port on the lower end thereof aligned with said inlet port and at least one outlet port on a side thereof;

an actuator assembly fitted in said cylinder including:
   two aligned upper and lower valve actuators,
   a first actuator rod attached to and actuatable by the uppermost of said actuators, one end of said rod projecting outward from said actuator, a valve stem attached to the projecting end of said actuator rod, having a valve plug for opening and closing said lower outlet port,
   a second actuator rod attached to and actuatable by said lower actuator, said second rod being in the form of a hollow cylinder concentric and coaxial with said first actuator rod, said first and second rods being independently actuatable by said upper and lower actuators, a hollow cylindrical valve stem attached to the projecting end of said hollow actuator rod, having a valve plug for opening and closing said inlet port, said valve plug having a central opening through which said first actuator is fitted, an independently controllable actuator assembly in said side outlet port including a valve actuator, an actuator rod attached to and actuatable by said actuator, one end of said rod projecting outward from said actuator, and a valve plug attached to the projecting end of said actuator rod for closing said outlet port, the bottom of said side outlet port being located below the lowermost surface of the lower end of said cylinder whereby liquids can be drained by gravity from said cylinder when said side outlet is open and said inlet and aligned outlet are both closed.

2. A manifold valve assembly as recited in claim 1 wherein said inlet port is in fluid flow communication with a supply source, and one of the other of said valve cylinders is provided with a port, which, when open discharges fluid into the atmosphere, and the third one of said ports, when open, is in fluid flow communication with a fluid distribution conduit.

3. A manifold valve assembly as recited in claim 2 wherein each of said first and third ports each are connected to a pass-through area not controlled by the valve plug that closes said port.

4. A manifold valve assembly as recited in claim 3 wherein each of said actuators assemblies is carried by a bonnet insertable into its respective valve cylinder, one of said bonnets including a cage portion positioned in said pass-through area, so as to continuously permit flow through the bonnet, said cage portion supporting a valve seat fitted in said inlet port.

5. A manifold valve assembly as recited in claim 1 wherein two outlet ports are provided on the side of said cylinder.

6. A manifold valve assembly as recited in claim 2 wherein said port for discharge to the atmosphere is at least as large in cross section as the smaller of said supply and distribution conduits.

7. A manifold valve assembly as recited in claim 5 wherein each of said two outlet port is in fluid flow connection with an elbow shaped conduit, and an actuator assembly is positioned in each of said conduits to control the flow of fluids therethrough.

8. A manifold valve assembly as recited in claim 1 wherein at least one of said valve plugs is positioned distally relative to its valve seat, so that said valve is opened by extension of the valve actuator rod and closed by retraction thereof.

9. A manifold valve assembly as recited in claim 1 wherein at least one of said valve plugs is positioned proximally relative to its valve seat, so that said valve is opened by retraction of the valve actuator rod and closed by extension thereof.

10. A manifold assembly, comprising:

a plurality of manifold valve assemblies each including a generally vertical valve cylinder having an inlet port at its top and at least two outlet ports near its bottom, a single actuator valve fitted for closing each of said ports, each including a valve actuator, an actuator rod attached to and actuatable by said actuator, one end of said rod projecting outward from said actuator, and at least one valve plug attached to the projecting end of said actuator rod, two of said three valves having rods that are coaxial with each other, said rods being independently actuatable by their respective actuators, a hollow cylindrical valve stem attached to the projecting end of said hollow actuator rod, having a valve plug for opening and closing an inlet port, said valve plug having a central opening through which said first actuator is fitted, said other two valves having valve plugs for opening and closing outlet ports, and being independently controllable by a valve actuator, one of said outlet ports, said outlet ports being configured so that liquids will drain by gravity from the lower end of said cylinder into either one of said outlet ports when the other of said outlet ports is closed.

11. A manifold assembly according to claim 10 wherein one of said outlet ports is located in the bottom of said cylinder and two outlet ports are located on opposite sides of said cylinder.

12. A manifold assembly according to claim 10 wherein said coaxial valves include a bonnet affixed to the actuators thereof, said bonnet being insertable into the inlet end of said valve cylinder and carrying said valve stems and plugs whereby said coaxial valves can be removed from said assembly as a unit.

13. A manifold assembly as recited in claim 12 wherein said bonnet includes a cage portion positioned in a pass-through area adjacent to said inlet, so as to continuously permit flow through the bonnet, said cage portion supporting a valve seat fitted to the inlet valve plug.

14. A manifold assembly as recited in claim 12 further comprising sealing means positioned between said bonnet and said valve body.

15. A manifold assembly as recited in claim 11 wherein each of said side outlets is positioned so that substantially all of the liquid in said cylinder will drain by gravity into either of said outlets when the inlet valve is closed and the outlet at the bottom of said cylinder is closed.

16. A manifold as recited in claim 10 wherein the outlet port at the bottom of said cylinder is connected to a fluid distribution conduit and the outlet on the side of said cylinder discharges to the atmosphere when it is open.

17. A manifold assembly as recited in claim 10 wherein the outlet port at the side of said cylinder is connected to a fluid distribution conduit and the outlet on the bottom of said cylinder discharges to the atmosphere when it is open.

* * * * *